United States Patent
Idehenre et al.

(10) Patent No.: US 11,573,466 B2
(45) Date of Patent: Feb. 7, 2023

(54) FABRICATION AND PROCESSING METHODOLOGIES FOR TRANSPARENT PN-JUNCTIONS AND THEIR USE IN LIQUID CRYSTAL HYBRID DEVICES

(71) Applicant: Government of the United States as represented by the Secretary of the Air Force, Wright-Patterson AFB, OH (US)

(72) Inventors: Ighodalo U. Idehenre, Tipp City, OH (US); Dean R. Evans, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/651,969

(22) Filed: Feb. 22, 2022

(65) Prior Publication Data
US 2022/0171224 A1    Jun. 2, 2022

Related U.S. Application Data

(62) Division of application No. 17/123,157, filed on Dec. 16, 2020, now Pat. No. 11,287,706.

(Continued)

(51) Int. Cl.
*G02F 1/135* (2006.01)
*G02F 1/1337* (2006.01)

(52) U.S. Cl.
CPC .......... *G02F 1/1354* (2013.01); *G02F 1/1357* (2021.01); *G02F 1/133784* (2013.01)

(58) Field of Classification Search
CPC . G02F 1/1354; G02F 1/133784; G02F 1/1357
See application file for complete search history.

(56) References Cited

U.S. PATENT DOCUMENTS

| | | | |
|---|---|---|---|
| 4,019,807 A * | 4/1977 | Boswell | G02F 1/139 250/214 LA |
| 5,880,798 A * | 3/1999 | Walton | G02F 1/1396 349/181 |
| 2020/0019023 A1 * | 1/2020 | Taniike | G02F 1/133784 |

FOREIGN PATENT DOCUMENTS

WO    WO-2017010346 A1 *  1/2017  ............... G02F 1/13

OTHER PUBLICATIONS

Tonooka K., et al., Preparation of transparent CuCrO Mg/ZnO p-n junctions by pulsed laser deposition, Thin Solid Films, vol. 515, Issue 4, Dec. 5, 2006, pp. 2415-2418.

(Continued)

*Primary Examiner* — Donald L Raleigh
(74) *Attorney, Agent, or Firm* — AFMCLO/JAZ; Timothy M. Barlow

(57) ABSTRACT

A transparent device for use in optical applications, and methods for using and manufacturing the device are disclosed. The device generally requires several layers, including (i) a first layer comprising a transparent conductive oxide (such as indium tin oxide (ITO)), (ii) a second layer comprising a transparent semiconductor (e.g., a pn-heterojunction or a pn-homojunction), the second layer having a surface facing the first layer, (iii) a third layer comprising a liquid crystal (such as E7), the third layer having a surface facing the second layer, and (iv) a fourth layer comprising either a second transparent conductive oxide or a second transparent semiconductor, the fourth layer having a surface facing the third layer. When light illuminates a surface of the transparent metal oxide pn-heterojunction or transparent metal oxide pn-homojunction, it induces photoconductivity, modifying the surface charges.

11 Claims, 3 Drawing Sheets

Related U.S. Application Data

(60) Provisional application No. 62/948,399, filed on Dec. 16, 2019, provisional application No. 62/948,454, filed on Dec. 16, 2019, provisional application No. 62/948,427, filed on Dec. 16, 2019.

(56) References Cited

OTHER PUBLICATIONS

Jayaraj, M.K., et al., Transparent p-n Heterojunction Thin Film Diodes, vol. 666 (Symposium F—Transport and Microstructural Phenomena) 2001, F4.1.

Rahman, H. et al., Band structure and diode characteristics of transparent pnhomojunction using delafossite CuInO2, Journal of Physics D: Applied Physics, vol. 53, No. 1.

* cited by examiner

FABRICATION AND PROCESSING METHODOLOGIES FOR TRANSPARENT PN-JUNCTIONS AND THEIR USE IN LIQUID CRYSTAL HYBRID DEVICES

BACKGROUND

Photorefractive materials form the bedrock of dynamic holography and wave mixing. In filtering applications, photorefractives have the advantage of not having a permanent refractive index profile as is the case with multilayer dielectric stacks. They are also more versatile than devices like acousto-optic modulators in wave mixing applications as the incident light itself can control the refractive index profile. The fact that the index profiles are generated, stored, and erased dynamically is what makes them attractive in the field of holographic data storage.

Various improvements and changes have occurred, and various architectures have been implemented. For example, amorphous photorefractive polymers are generally a composite of conductive polymers and plasticizer doped with a photo-ionizing sensitizer. Dielectrically and optically anisotropic molecules (chromophores) that reorient in response to an external field and mix well with the polymer host can be added to enhance the photorefractive response. Examples of such blends include the electro-optic chromophore (DMN-PAA/DHADC-MPN), photoconductor (PVK), sensitizer (TNH/C60), and plasticizer (ECZ). Today, organic photorefractive polymers have achieved diffraction efficiencies of nearly 100%, can be fabricated to large areas (12"×12"), and possess wavelength selectivity that is easily tuned using dyes, $C_{60}$, or quantum dots.

For light valves, however, the architecture has not evolved for some time. For these devices, a photoconducting substrate and an externally applied field is sufficient to modulate the liquid crystal region. This photorefractive design uses the interaction between the photoconductor and ions in the liquid crystal to establish a space-charge field at their interface. The general effect articulated by some is that charge is built up at the interface by ions drawn from the liquid crystal. These surface charges are then neutralized by the injection of ions from the electrode (ITO) into the liquid crystal layer. In the cases where a photoconductor is used, the flow of the charges to the surface is regulated by optical illumination. During inhomogeneous illumination, brighter regions experience higher conductivity resulting in lower concentrations of charges at the surface. The darker regions have lower conductivity allowing for more charges to build up at the surface. The spatial distribution of the surface charge density, σ, creates a charge image that follows the inhomogeneous illumination pattern. The space-charge field resulting from the inhomogeneous distribution of surface charge modulates the liquid crystal layer leading to the formation of a hologram. E7 is a common liquid crystal material used in these experiments and is popular due to its high birefringence, large dielectric anisotropy, and high ionic content (lower resistivity) relative to other liquid crystals such as TL205.

However, these devices have yet to reach the diffraction efficiencies of bulk photorefractives (light valves range from 10-15%), and thus improvements in such devices are both useful and desirable.

BRIEF SUMMARY

The present disclosure involves novel processing and fabrication techniques for creating transparent pn junctions, and devices which can be developed using such techniques.

A first aspect of the present disclosure is drawn to a transparent device for use in optical (holographic and non-holographic) applications. In some embodiments, the devices will preferably be transparent to visible light, such as allowing at least 80%, 90%, or 95% transmission of visible light through the device, although as will be understood by skilled artisans, the materials can be tailored to operate (i.e., be transparent) in different spectral regions, including, e.g., infrared (IR). The device will typically include a few layers, including (i) a first layer comprising a first transparent conductive oxide (such as indium tin oxide (ITO)), (ii) a second layer comprising a transparent pn heterojunction or pn-homojunction semiconductor (including wide band gap semiconductors and insulators with semiconductor-like properties), the second layer having a surface facing the first layer, (iii) a third layer comprising a liquid crystal (such as E7), the third layer having a surface facing the second layer, and (iv) a fourth layer comprising either a second transparent conductive oxide, the fourth layer having a surface facing the third layer, or a second transparent pn heterojunction or pn-homojunction semiconductor.

Optionally, the transparent device includes liquid crystal alignment layers to control the orientation of the liquid crystal molecules (such as polyimides, polyamides, etc.), the alignment layers being on the faces of the layers adjacent to the third layer. Optionally, the alignment layers, once applied, are rubbed to achieve planar alignment, where the two alignment layers are configured such that the rubbing direction for one layer is anti-parallel to the rubbing direction of the other layer; although parallel rubbing has benefits in providing flexopolarization effects that make the liquid crystal molecules more sensitive to the induced, thus enhancing the performance. In some embodiments, the alignment layers are configured to have a homeotropic alignment. In some embodiments, the alignment layers are configured to have a hybrid alignment (one layer being planar and the other layer being homeotropic).

Optionally, the first and/or fourth layer is attached to a transparent supporting substrate (such as window glass). The transparent device according to claim 1, wherein the first transparent conductive oxide, the second transparent conductive oxide, or both, comprises indium tin oxide.

Optionally, the liquid crystal layer comprises a nematic liquid crystal, a cholesteric liquid crystal, a smectic liquid crystal, or a combination thereof.

Optionally, the transparent semiconductor comprises ZnO and CuO.

A second aspect of the present disclosure is drawn to a method for adjusting a liquid crystal orientation. The method involves modifying the surface charges on a transparent metal oxide pn-heterojunction or transparent metal oxide pn-homojunction by illuminating a surface of the oxide pn-heterojunction or transparent pn-homojunction with light and inducing photoconductivity, then allowing the modified surface charges to create or control a space charge field located at or near a surface of a transparent liquid crystal layer. The space charge field governs an orientation of liquid crystals in the transparent liquid crystal layer. This is very different than the case of using standard photoconductors for making liquid crystal lights valves (described with prior art), as photodiodes (i.e., pn-junctions) have a much greater photosensitivity than typical photoconductors. The fabrication process disclosed herein provides an approach for taking advantage of the benefits of using a pn-junctions, while maintaining flexibility, ease of tailoring materials for new spectral regions, and low fabrication costs.

A third aspect of the present disclosure is drawn to a method for depositing particles (such as metal oxides) on a substrate. The method involves generating a colloidal solution comprising at least one metal oxide, by ball milling a plurality of metal oxide particles that are in a solution comprising an organic surfactant and/or functional coating, then coating a substrate (such as a transparent conductive oxide) with the ball-milled colloidal solution to form a thin film layer, and then heat treating the thin film layer on the substrate. Optionally, the colloidal solution comprises two or more metal oxides. Optionally, the method also includes repeating the coating and heat treating steps to form at least one additional layer. For example, the method may involve forming a first thin film and then a second thin film on top of the first thin film. In some embodiments, both thin films would comprise the same metal oxide. In some embodiments, they comprise different metal oxides.

Optionally, the coating is accomplished via spin-coating, dip-coating, or evaporative deposition. Optionally, the coating can then be baked, allowing any organics to undergo decomposition and/or a chemical reaction or transformation.

Optionally, the organic surfactant and/or functional coating is used to produce the colloidal solution comprises additional materials configured to coat and/or react with the surface of at least one metal oxide in the solution.

DETAILED DESCRIPTION

As used herein, articles such as "a" and "an" when used in a claim, are understood to mean one or more of what is claimed or described.

As used herein, the expression "at least one" means one or more and thus includes individual components as well as mixtures/combinations.

As used herein, the term "about [a number]" is intended to include values rounded to the appropriate significant digit. Thus, "about 1" would be intended to include values between 0.5 and 1.5, whereas "about 1.0" would be intended to include values between 0.95 and 1.05.

As used herein, the terms "include", "includes" and "including" are meant to be non-limiting.

A first aspect of the present disclosure is drawn to a transparent device for use in optical applications. For example, the disclosed pn-heterojunction (or homojunction) hybrid devices can be used for non-holographic applications such as light valves (e.g., liquid crystal light valves, lensing, diffraction, scattering, etc.). Alternatively, these devices can be used for holographic and dynamic holographic applications such as photorefractive devices (e.g., scattering, diffraction, beam coupling, wave mixing, etc.).

Figure 1A:
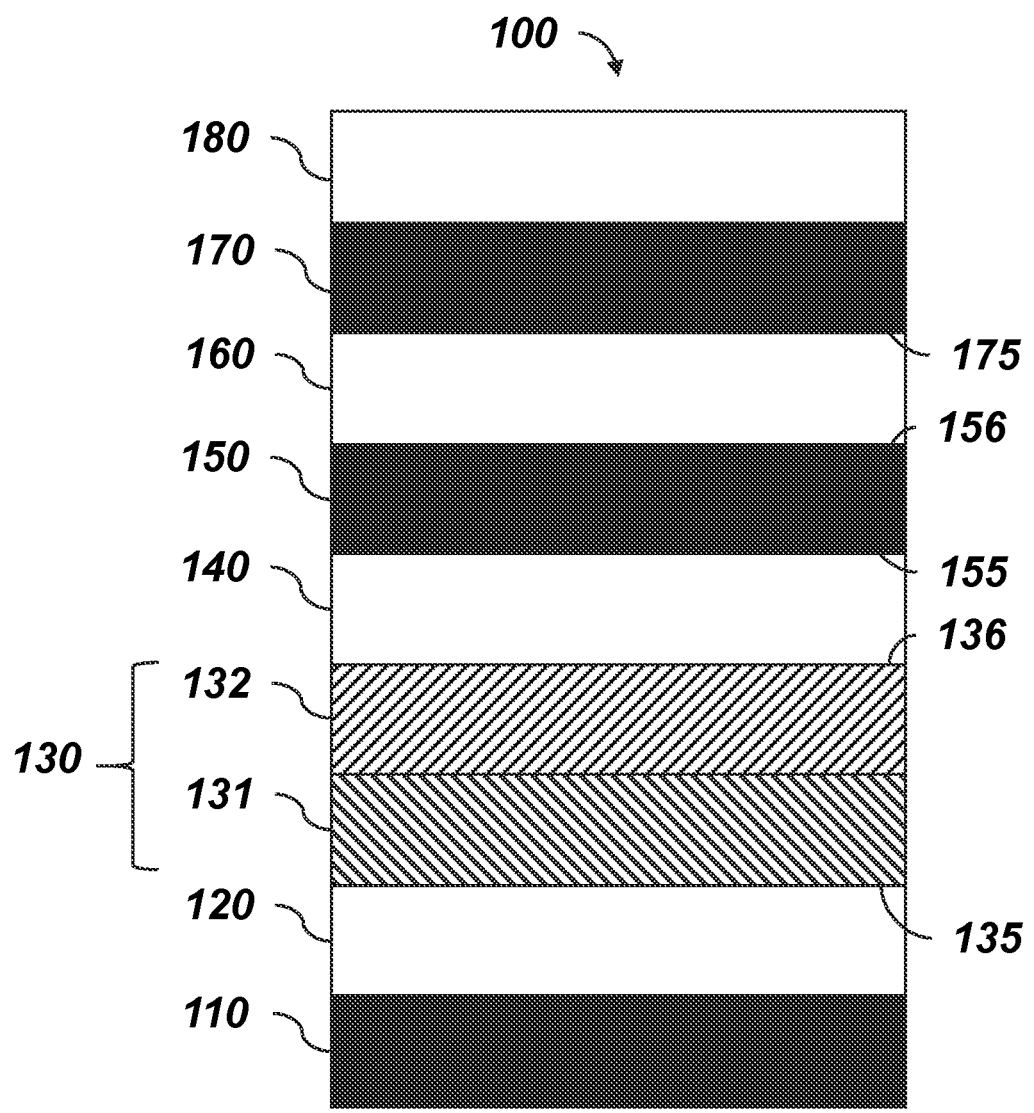
FIGS. 1A and 1B are diagrams of cross-sections showing layers of disclosed devices.
Figure 1B:
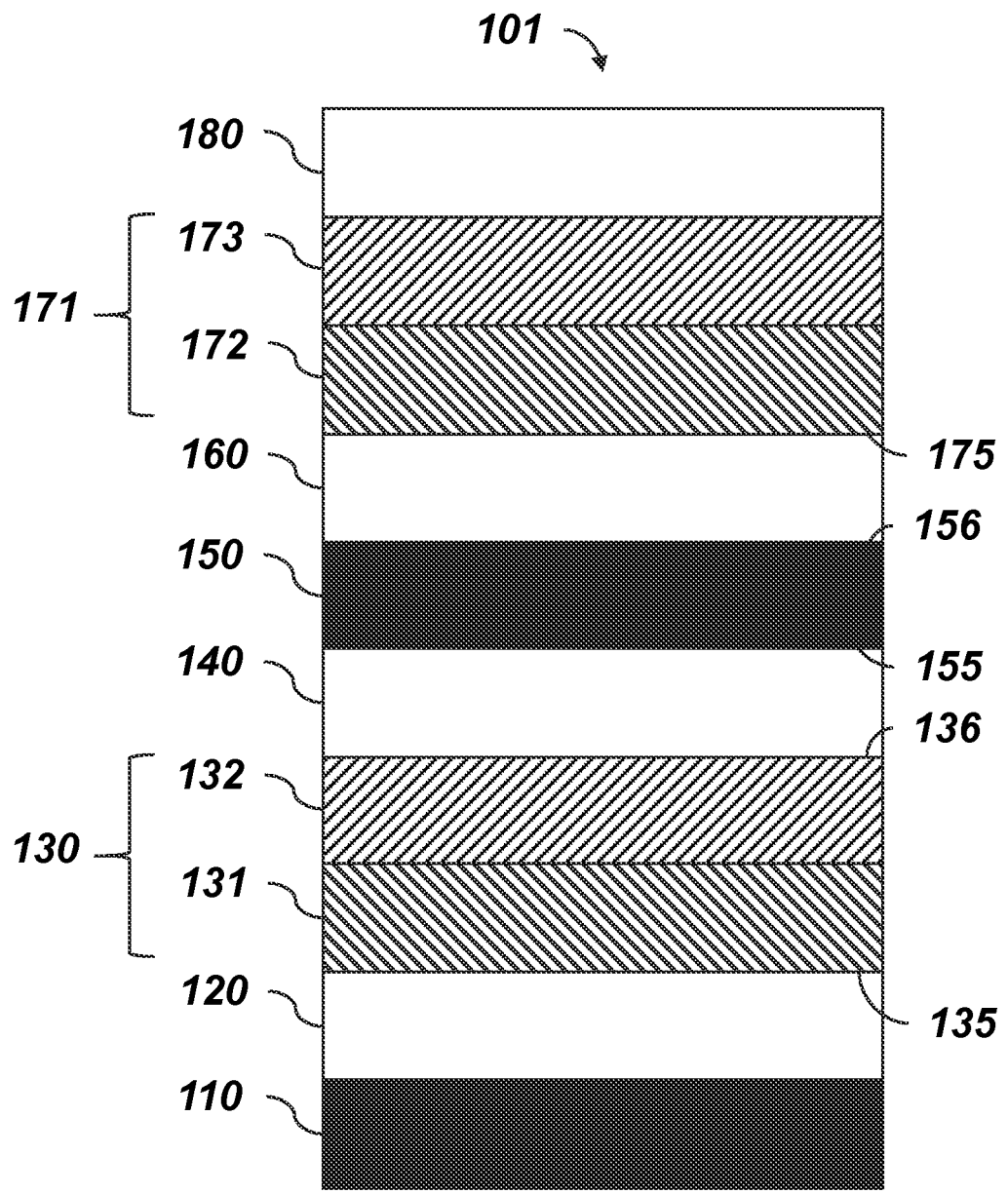

The disclosed devices can best be understood with reference to FIGS. 1A and 1B. The device will preferably comprise at least four layers.

The device 100, 101 will preferably include a first layer 120 that comprises a transparent conductive oxide (TCO).

Non-limiting examples of transparent conductive oxides include: oxides of titanium, hafnium, zirconium, niobium, zinc, bismuth, lead, indium, tin, and mixtures thereof, and may be doped with other elements, such as gallium or aluminum. Specific examples of transparent conductive oxides include, without limitation: indium tin oxide, indium zinc oxide, fluorinated tin oxide ("FTO"), a doped zinc oxide, such as gallium-, aluminum-, or tin-doped zinc oxide ("GZO", "AZO" and "TZO", respectively), or a doped titanium dioxide, such as niobium-doped $TiO_2$ ("NTO"). Suitable transparent conductive oxides include oxygen-deficient transparent conductive oxides. By "oxygen-deficient transparent conductive oxide", it is meant that the conductive oxide is deposited under conditions, such as by sputtering, e.g. by MSVD, in an inert atmosphere, such as an argon atmosphere with a subsaturation amount of oxygen, yielding the oxygen-deficient, or sub-stoichiometric TCO. Oxygen-deficient TCOs, such as oxygen-deficient ITO, are broadly-known and are readily made by those of ordinary skill in the art.

The first layer may also, or alternatively, comprise other transparent layers or materials, such as graphene, which is used for some spectral regions.

The device will also preferably include a second layer 130 comprising a transparent semiconductor (which may include known insulator materials with semiconducting properties), having at least one surface 135 facing the first layer 120, and preferably in contact with the first layer 120. The transparent semiconductor may comprise a stack of one or more layers 131, 132. The transparent semiconductor may be a pn-homojunction, or may be a pn-heterojunction.

In some embodiments, one or more sublayers 131, 132 comprises or consists of one or more metal oxides. In some embodiments, each sublayer 131, 132 comprises one or more metal oxides. In some embodiments, a first sublayer 131 comprises or consists of one metal oxide, and a second sublayer 132 comprises or consists of a second metal oxide. The metal oxides may comprise any transition metal oxide or post-transition metal oxide. When only metal oxides are used, one metal oxide must be an n-type semiconductor, and one metal oxide a p-type semiconductor. The metal oxides may be doped or undoped. In some embodiments, the metal oxides are undoped. Preferable metal oxides include cobalt, copper, iron, manganese, nickel, tin, and zinc oxides.

In some embodiments, one or more sublayers 131, 132 comprises or consists of one or more metal non-oxides. In some embodiments, each sublayer 131, 132 comprises one or more metal non-oxides. In some embodiments, a first sublayer 131 comprises or consists of one metal non-oxide, and a second sublayer 132 comprises or consists of a second metal non-oxide. Metal non-oxide semiconductors useful in the present disclosure can include any metal non-oxide semiconductors known to those of skill in the art, such zinc or carbon sulfides, or gallium nitride.

In some embodiments, one or more sublayers 131, 132 comprises or consists of one or more nonmetals. In some embodiments, each sublayer 131, 132 comprises one or more nonmetals. In some embodiments, a first sublayer 131 comprises or consists of one nonmetal, and a second sublayer 132 comprises or consists of a second nonmetal. Nonmetal semiconductors useful in the present disclosure can include any nonmetal semiconductor known to those of skill in the art, such as graphitic carbon nitride (g-CN) or silicon carbide (SiC).

The device will also preferably include a third layer 150 comprising a liquid crystal material. The third layer 150 has a surface 155 facing the second layer 130.

Any liquid crystal phase (or mesophase) may be utilized, including thermotropic liquid crystals (such as nematic, smectic, cholesteric/chiral, discotic, or conic phases), lyotropic liquid crystals, or metallotropic liquid crystals. In some embodiments, the liquid crystal material can be twisted nematic (TN), super-twisted nematic (STN), ferroelectric, magnetic, or chiral nematic liquid crystals. In some embodiments, one or more phases are present. Such approaches allow for different device functionality for either reflection or transmission geometries. In some embodiments, the liquid crystals include polymer dispersed liquid crystals (PDLC) or ferroelectric colloidal liquid crystal suspensions.

Non-limiting examples of commercial nematic liquid crystals include, but are not limited to, E7, E44, E48, E31, E80, BL087, BL101, ZLI-3308, ZLI-3273, ZLI-4801, ZLI-4692, ZLI-5048-000, ZLI-5049-100, ZLI-5081, ZLI-5100-100, ZLI-5800-000, MLC-6041-100.TL202, TL203, TL204 and TL205, and MLC-6267, 6284, 6287, 6288, 6406, 6422, 6423, 6425, 6435, 6437, 7700, 7800, 9000, 9100, 9200, 9300, 10000, manufactured by E. MERCK (Darmstadt, Germany). Further examples of chiral nematic liquid crystal materials include MERCK BL112, BL126, BL-03, BL-048 or BL-033, which are available from EM INDUSTRIES (Hawthorne, N.Y.). Other commercially available liquid crystals include LIXON5036XX, 5037XX, 5039XX, 5040XX, 5041XX, JC-1041XX, and the like (manufactured by CHISSO CORPORATION); and cyanobiphenyl-based nematic liquid crystal, 4-cyano-4'-pentylbiphenyl (5CB), manufactured by ALDRICH CHEMICAL COMPANY.

The device will preferably include a fourth layer 170, 171 comprising either a TCO 170 or a transparent semiconductor 171, the fourth layer 170, 171 having a surface 175 facing the third layer 150.

If a TCO 170 is present, the TCO of the fourth layer 170 may be the same, or different, from the TCO of the first layer 120.

The transparent semiconductor 171 may include one or more sublayers 172, 173, which can be considered a second transparent semiconductor, that can be the same configuration, or a different configuration, from transparent semiconductor 130. Appropriate transparent semiconductors suitable for use here include any transparent semiconductor known to those of skill in the art, which, as described previously, includes metal oxides (such as ZnO and/or CuO), metal non-oxides (such as ZnS and/or CuS), and nonmetals (such as g-CN or SiC). The transparent semiconductor may also include known insulator materials with semiconducting properties, such as topological insulator semiconductors. In some embodiments, the fourth layer 171 is a pn-heterojunction. In some embodiments, the fourth layer 171 is a pn-homojunction.

In some embodiments, one or more sublayers 172, 173 comprises or consists of one or more metal oxides. In some embodiments, each sublayer 172, 173 comprises one or more metal oxides. In some embodiments, a first sublayer 172 comprises or consists of one metal oxide, and a second sublayer 173 comprises or consists of a second metal oxide. The metal oxides may comprise any transition metal oxide or post-transition metal oxide. When only metal oxides are used, one metal oxide must be an n-type semiconductor, and one metal oxide a p-type semiconductor. The metal oxides may be doped or undoped. In some embodiments, the metal oxides are undoped. Preferable metal oxides include cobalt, copper, iron, manganese, nickel, tin, and zinc oxides.

In some embodiments, one or more sublayers 172, 173 comprises or consists of one or more metal non-oxides. In some embodiments, each sublayer 172, 173 comprises one or more metal non-oxides. In some embodiments, a first sublayer 172 comprises or consists of one metal non-oxide, and a second sublayer 173 comprises or consists of a second metal non-oxide. Metal non-oxide semiconductors useful in the present disclosure can include any metal non-oxide semiconductors known to those of skill in the art, such zinc or carbon sulfides, or gallium nitride.

In some embodiments, one or more sublayers 172, 173 comprises or consists of one or more nonmetals. In some embodiments, each sublayer 172, 173 comprises one or more nonmetals. In some embodiments, a first sublayer 172 comprises or consists of one nonmetal, and a second sublayer 173 comprises or consists of a second nonmetal. Nonmetal semiconductors useful in the present disclosure can include any nonmetal semiconductor known to those of skill in the art, such as graphitic carbon nitride (g-CN) or silicon carbide (SiC).

In preferred embodiments, the device comprises at least one transparent semiconductor layer that comprises a metal oxide.

The device may also have various optional layers.

The device may include alignment layers 140, 160 on either side of the third layer 150. These alignment layers may optionally comprise a polymer, such as a polyimide (such as PI-2555) or polyamide (such as a nylon (polyamide) multipolymer containing polyamide 6 (PA 6), polyamide 66 (PA 66) and polyamide 610 (PA 610) resins). The alignment layer may comprise azo compounds, such as azobenzenes.

The alignment layers, once applied, may be rubbed to achieve planar alignment. In such cases, the device preferably is configured such that the rubbing direction for one alignment layer is anti-parallel to the rubbing direction of the other alignment layer, although parallel rubbing has benefits in providing flexopolarization effects that make the LC molecules more sensitive to the induced field.

Optionally, the first layer 120 and/or the fourth layer 170, 171 is attached to a transparent supporting substrate 110, 180. This transparent supporting substrate may be, e.g., a transparent polymer, glass, or crystalline material. Non-limiting examples of glass that can be used as a substrate include clear glass, Starphire®, Solargreen®, Solextra®, GL-20®, GL35™, Solarbronze®, Solargray® glass, Pacifica® glass, SolarBlue® glass, Solarphire® glass, Solarphire PV® glass, and Optiblue® glass, all commercially available from PPG Industries Inc. of Pittsburgh, Pa. For example, glasses can include conventional soda-lime-silicate glass, or borosilicate glass. Non-limiting examples of crystalline material include ZnS, ClearTran®, and Sapphire, depending on the spectral region of interest (e.g., ZnS is transparent in IR, etc.)

A second aspect of the present disclosure is drawn to a method for adjusting a liquid crystal orientation. Using a device as described above, the method involves modifying the surface charges on the second layer 130 (the transparent metal oxide pn-heterojunction or transparent metal oxide pn-homojunction) by illuminating a surface 135, 136 of the transparent metal oxide pn-heterojunction or transparent metal oxide pn-homojunction with a light and inducing photoconductivity. At that point, the modified surface charges will create or control a space charge field located at or near a surface 155, 156 of a transparent liquid crystal layer. The space charge field governs the orientation of the liquid crystals in the transparent liquid crystal layer, thus establishing an index grating.

Thus, the disclosed transparent pn-heterojunction and/or homojunction hybrid devices can be used for optical applications, where an induced photoconductivity is created by the illuminated pn-heterojunction or pn-homojunction, which modifies the surfaces charges to create/control the space charge field (SCF). The SCF in turn governs the liquid crystal orientation as required in various optical applications (i.e., it provides an index modulation).

The surface charges act in at least two ways: (1) they provide a source of charges, and (2) they establish a screening effect. These two ways allow the hybrid devices to be configured for non-holographic applications such as light valves, or for holographic and dynamic holographic applications such as photorefraction. Other applications include the use of the hybrid devices, as part of a larger system, for beam coupling, diffraction, lensing, and/or scattering, the configurations of which will be readily recognized by those of skill in the art. For example, in one application, the device is used between two panes of window glass as part of a smart window system.

Example 1 (Light Valve Fabrication)

Liquid crystal light valves were assembled utilizing a glass window coated with ITO. The ITO was then coated with two adjacent layers of ZnO and one layer of CuO. The additional layer of ZnO was chosen to avoid the potential effects of dark current (due to diffusion/dielectric breakdown) of the photodiode thin film. The field that modulates the liquid crystal is related to the modulation of the surface charge which in turn is regulated by the photodiode. In reverse bias leakage current is harmful because it allows current to flow through to the photodiode/liquid crystal interface even in the dark.

Ideally when the light valve is inhomogeneously illuminated in reverse bias, the currents should be as close to zero as possible in the darker areas. That way the dark regions can maximize the build-up of surface-charge, while the bright regions neutralize the surface-charge generating a usable space-charge field. The higher the surface charge density the higher the space charge field and in principle the stronger the grating. By increasing the thickness of the photodiode, the voltage threshold for dielectric breakdown can be increased (reducing leakage current).

The CuO layer was spin-coated with an alignment layer (0.125 wt % elvamide in methanol), which was paired with an ITO coated glass also spin-coated with an alignment layer. The two elvamide layers were rubbed with a velvet cloth to achieve planar alignment. The rubbing directions of the windows were assembled to be anti-parallel to each other.

Interactions between the surfaces of a liquid crystal cell and its liquid crystal molecules play a pivotal role, as they generally dictate the preferred direction of orientation (i.e., liquid crystal director) of the mesogens near the surface and beyond. The concept of using the surface interactions to impose a liquid crystal director profile in the liquid crystal system is what is known as surface alignment. While various surface alignments known to those of skill in the art can be used, two well-known alignments that may be used for devices and methods according to the present disclosure include those referred to as planar homogeneous and homeotropic alignments.

Additionally, there also exists a continuum of alignments where the director has an angle with respect to the surface normal. This is a subset of homogeneous where the angle of the director with respect, known as the pre-tilt angle $\theta_0$, is uniform throughout the cell.

The alignment and anchoring conditions of a liquid crystal cell can be tailored, e.g., by treating the surfaces with certain chemicals (siloxane, oleic acid, polyimide, etc.). In fact, planar homogeneous (often shortened to planar alignment) can be produced by mechanical rubbing of the surface of the glass or ITO with paper or cloth. The surface interactions between the glass and the liquid crystal are generally weak, so the addition of a thin chemical layer serves to strengthen the interactions. In the case of weak interactions (or weak anchoring), the easy access can change depending on the force applied and the orientation of other liquid crystals in the system.

Homeotropic alignments are generally achieved using surfactants (like CTAB, HTAB, and oleic acid), where the polar heads bind to the glass or ITO and the non-polar tails extend into the liquid crystal layer. Many liquid crystals, like 5CB, have non-polar tails that have an affinity with the surfactant forcing the mesogen into a homeotropic orientation. Selecting pretilt angles can be achieved using polyimide, azobenzenes, and oblique deposition of SiO. Lastly, it should be noted that the range of the surface alignment effect is limited, so very thick samples may have different no depending upon the position and thickness of a liquid crystal cell. That is to say, if the bulk is too large it may not be possible to impose a uniform preferred equilibrium direction no everywhere.

The cell was separated using 10 µm glass rod spacers (PF-50, Nippon Electric Glass Co., Ltd.) mixed with a UV curable optical adhesive (NOA 65, Norland Products) and applied to the edges or corners of the cell; other techniques include dispersing the spacers in the liquid crystal itself. The optical adhesive was polymerized using a UV lamp with an intensity of 40 mW/cm$^2$ for 15 min. After curing, the cells were filled with E7 liquid crystal by capillary action. This cell was optically transparent.

Example 2 (Application/Use of Device)

Figure 2:
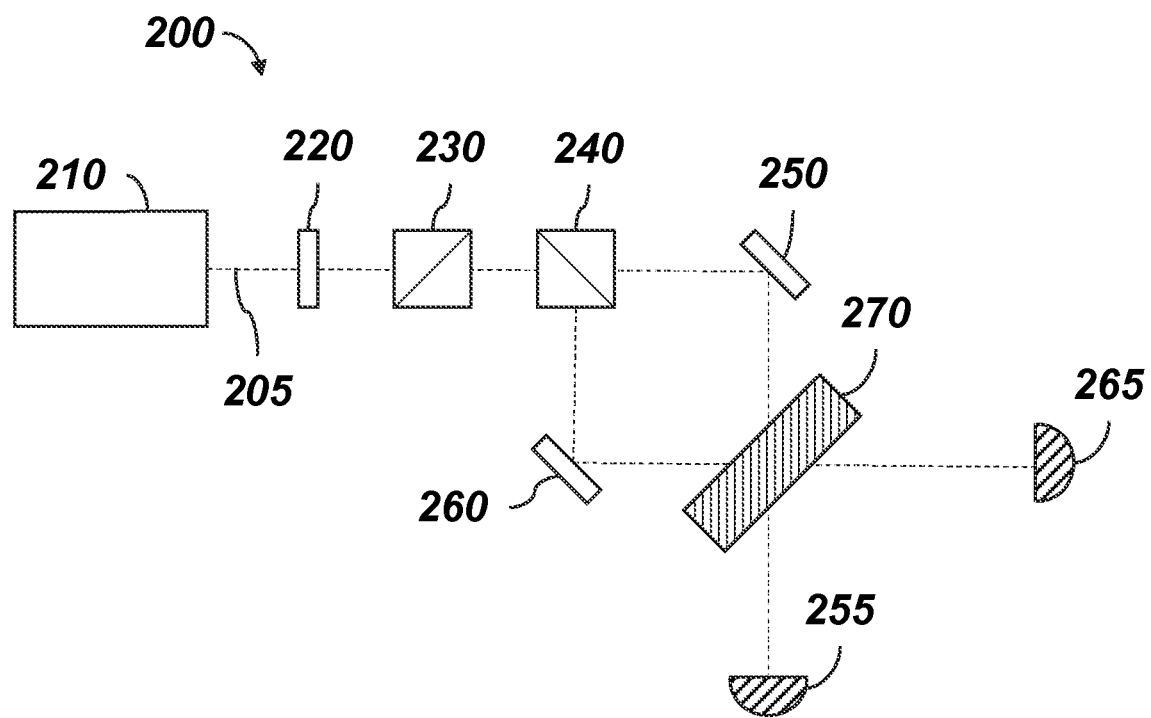
FIG. 2 is a diagram of a two-wave mixing arrangement used to test a disclosed device.

In this example, the holographic abilities of the light valve prepared in Example 1 were tested using a two-wave mixing arrangement 200 shown in FIG. 2. The experiment gives information about the phase shift between the interference pattern and grating as well as information quantifying the strength of the grating (i.e. coupling efficiency).

In the experiment, a collimated beam 205 from a Verdi 5 diode-pumped solid-state laser 210 with a wavelength of 532 nm and a spot size $w_0$ (1/e$^2$) of 2.2 mm was directed through a half-wave plate 220 and polarizer 230. This allowed the adjustment of both the polarization state and amplitude of the laser beam 205. After leaving the polarizer 230, the beam passes through a 45° 50/50 beam splitter 240. One of the split beams was directed to an ordinary mirror 250, while the other was directed to a piezoelectric mirror 260. The piezoelectric mirror was controlled by a National Instruments DAQ (6221-B, not shown) and a Moundtech high voltage amplifier (M94100, not shown). Using the piezoelectric mirror 260, the phase difference between the beams can be rapidly changed based upon the voltage input. By quickly changing the phase difference between the two beams, a phase shift between the intensity profile and the index grating can be quickly introduced without rewriting the grating. The reflected beams from both mirrors are then directed at a single spot where the light valve 270 was placed. The voltage across the light valve 270 was controlled using the same National Instruments DAQ connected to a second high voltage amplifier. The grating spacing Λ generated by the interference of the two beams ($\Lambda=\lambda/2 \sin(\theta)$), where λ is the wavelength of the plane waves and θ is the angle between the two incident plane waves) was set to be Λ=1 µm for all test. After passing through the light valve 270, the power of both beams was measured using power meters 255, 265. The experiment was arranged so that the rubbing direction of the cell's alignment layer, the polarization of beams, and the grating vector generated by the beams are all on the plane of the table on which the experiment was run.

At the beginning of each measurement, the voltage across the light valve was set to a given value (starting at −30 V) and the sample was illuminated by the two beams for 1 minute to allow a grating to form. A 100 ms voltage pulse was sent to the piezoelectric mirror to generate a phase shift between the beams. The 100 ms pulse width was chosen to minimize the rewriting of the grating at the laser power used (10 mW for each beam), while maximizing the number of data points measured over the pulses duration. The amplitude of the pulse was varied from 0-450 V at increments of 10 V three times in total. The low state of the pulse was always 0 V and lasted for 900 ms, before the next pulse was applied. The power of the two beams was measured throughout the experiment every 10 ms. Once complete, the measurement was repeated for the next voltage increment applied to the light valve. The voltage of the liquid crystal, was varied from −30 V to 30 V at increments of 1 V.

A third aspect of the present disclosure is drawn to a method for depositing particulate materials (such as those materials discussed previously, including, e.g., metal oxides) on a substrate. This method provides a relatively inexpensive means to produce these, e.g., the disclosed pn-heterojunctions or pn-homojunctions.

Large micron-sized particles are reduced to the nanometer scale via mechanical ball milling. Ball milling is a simple, scalable technique that uses the high energy collision of beads (with each other and the crucible container) to break apart solid material into smaller pieces. High purity polycrystalline materials (including, e.g., metal oxides such as ZnO and CuO), are readily available to purchase at a low cost, so with the proper equipment, it is relatively straightforward to produce large amounts of nanoparticles (e.g., particle sizes of 100 nm or less) for use in thin film fabrication. For many coating techniques, to deposit the material on the surface of a substrate requires the particles to be dispersed in a solvent that can be easily evaporated. When in a solution, regardless of the fabrication method, the surface of the particles must be coated with a surfactant to prevent agglomeration. Indeed, one of the factors limiting the minimum particle size is the natural tendency towards agglomeration. When the particles are cleaved by ball milling, molecular bonds tend to be broken, leaving behind active/reactive ionic surfaces. This problem is often compounded by the fact that weak intermolecular interactions (Van der Waals) become pronounced at such small scales leading to attractive forces between particles. Left unchecked the smaller particles will eventually find one another and attempt to form new bonds reversing the effects of ball milling. To avoid this issue an organic surfactant and/or functional coating is added to either passivate and/or isolate the surface.

The disclosed method comprises at least three steps: Milling/Mechanochemical Synthesis, Coating, and Heat Treatment. In some embodiments, the coating and heat treatment is repeated, to form multiple layers of thin films. The films may be the same composition, or may have different compositions.

Milling/Mechanochemical Synthesis

The first step involves generating a colloidal solution comprising at least one material for a semiconductor (such as a metal oxide), by ball milling and/or mechanochemical synthesis, a plurality of particles comprising the material for the semiconductor (e.g., metal oxide particles) in an organic surfactant and/or functional coating solution.

In some embodiments, metal oxide particles with a plurality of compositions are used in one or more colloidal solutions. That is, in some embodiments, each colloidal solution comprises two or more metal oxides, such as a first metal oxide and a second metal oxide. In other embodiments, one or more colloid solutions are created, each formed from metal oxide particles with a single composition.

Generally, the solution comprises a material that is configured to coat or react with the surface of the at least one metal oxide, providing, e.g., a passivant and/or functional coating on the particles, altering the metal oxide's performance.

Example 3 (Milling)

Oxide solutions composed of CuO (size of about 1 μm or less) and ZnO (size of about 100 nm) were synthesized via mechanical grinding. The preparation of each suspension was carried out in a planetary ball mill, with zirconia crucibles and zirconia beads. The crucibles are free to rotate about their own central axis, while also rotating about a central axis of the base disk on which the crucibles rest. During standard operation, the crucible and the support disk rotate in opposite directions. With the zirconia beads free to churn about the inside of the crucible (producing a Coriolis effect), a great deal of energy can be built up by the accelerated beads. Ball milling oxide powder in a heptane/oleic acid solution is convenient because the energy can be used to break apart the particles until they reach nanometer sizes, coat them with the surfactant, and disperse them in the desired solvent all at once. The particles can either be broken up via bead to bead collisions or bead to crucible collisions. The process can be highly randomized with a distribution not only with respect to particle size, but also surface structure; although it is known that longer grinding times can result in monodispersed particle sizes.

The oxides were milled in 500 mg of oleic acid and 10 g of heptane (dispersant). The formulation was found to be suitable for producing stable suspensions of CuO/ZnO. The precursor mixture was ground at 500 rpm with powder to bead weight ratio of roughly 1:10 for 25 hours (at these grinding times, the particles can be monodispersed).

Coating

The second step involves coating a substrate with the colloidal solution to form a thin film layer.

While various options for coating a substrate with the colloidal suspension to form a thin film are known to skilled artisans, preferably the coating is accomplished via spin-coating, dip-coating, or evaporative deposition. Such techniques are well known in the art, and a skilled artisan will readily understand the parameters required to successfully coat a substrate using such techniques.

Example 4 (Coating)

The milled colloidal solutions of ZnO and CuO were filtered using a 0.45 μm PVDF membrane (Durapore) to remove any large particles and agglomerates. The solutions showed minimal scattering compared to the unfiltered suspensions. Bare glass windows 1.25×2.5×0.1 $cm^2$ and ITO coated on corning glass windows of 1.25×2.5×0.1 $cm^2$ were prepared for coating by a 3 minute emersion in acetone and methanol baths. After each emersion, starting with acetone, the surface of each window was wiped with a cloth and the surface was blown with nitrogen to remove any cloth fibers. The cleaned slides were placed on a spin coater with the ITO side up. After coating on ITO glass window, a yellowish/green tinted film was observed in the case of the CuO colloidal suspension and a blueish/violet film in the case of ZnO colloidal suspension.

Heat Treatment

The third step is to heat treat the thin film layer on the substrate.

Where there is more than one semiconductor material (e.g., multiple oxides of a given metal such as copper oxides $Cu_2O$ and CuO), the temperature of the heat treatment should be chosen to ensure the desired semiconductor (e.g., the desired oxide of a given metal) results from the treatment.

In some embodiments of the method, the method also includes repeating the coating and heat treating steps to form at least one additional layer. For example, the method may include forming a first thin film and then a second thin film on top of the first thin film. In some embodiments, both layers would comprise the same metal oxide (e.g., two ZnO layers). In some embodiments, they comprise different metal oxides. (e.g., a ZnO layer and a CuO layer).

Example 5 (Heat Treatment)

The glass/ITO/ZnO and glass/ITO/CuO samples were heat treated for 2 hours in a 600° C. furnace. It should be noted that while $Cu_2O$ can form with lower temperature heat treatments, at sufficiently high temperatures (>350° C.), the films become CuO. Thus, in this example, to ensure full conversion (as confirmed by Raman spectroscopy), 600° C. was chosen. After removing the sample from the oven to cool, additional layers were added following the same procedure. The same protocol was used to produce ZnO layers. The surfaces appear smooth and uniform upon visual inspection. Samples prepared using the CuO colloidal suspension showed a copper tint after heat treatment.

Those skilled in the art will recognize or be able to ascertain using no more than routine experimentation many equivalents to the specific embodiments of the invention described herein. Such equivalents are intended to be encompassed by the following claims.

What is claimed is:

1. A transparent device for use in optical applications, the device comprising:
   a first layer comprising a first transparent conductive oxide;
   a second layer comprising a first transparent semiconductor, the second layer having a surface in contact with the first layer;
   a third layer comprising a liquid crystal, the third layer having a surface facing the second layer; and
   a fourth layer comprising either a second transparent conductive oxide or a second transparent semiconductor, the fourth layer having a surface facing the third layer,
   wherein the second layer is a pn-heterojunction or a pn-homojunction;
   further comprising a first alignment layer between the second layer and the third layer, and a second alignment layer between the third layer and the fourth layer, the first alignment layer and second alignment layer comprising a material selected from the group consisting of polyimide, polyamide, and azo compounds; wherein the second layer comprises two or more layers, wherein each layer comprises one or more metal oxides selected from the group consisting of oxides of Co, Cu, Fe, Mn, Ni, Sn, and Zn, each of the two or more layers having the same or distinct material composition.

2. The transparent device according to claim 1, wherein the first alignment layer and the second alignment layer have each been rubbed to achieve planar alignment, and wherein the second alignment layer is configured such that the rubbing direction is either anti-parallel to the rubbing direction of the first alignment layer, or a parallel rubbing direction to induce flexopolarization effects that make the liquid crystals molecules more sensitive to the induced field.

3. The transparent device according to claim 1, wherein the first alignment layer and the second alignment layer provide planar, homeotropic, or hybrid alignments.

4. The transparent device according to claim 1, further comprising a first transparent substrate in contact with the first layer, and a second transparent substrate in contact with the fourth layer.

5. The transparent device according to claim 4, wherein the first transparent substrate, the second transparent substrate, or both, is glass.

6. The transparent device according to claim 1, wherein the first layer, the second layer, or both, comprise indium tin oxide.

7. The transparent device according to claim 1, wherein the liquid crystal is E7.

8. The transparent device according to claim 1, wherein the liquid crystal layer comprises a nematic liquid crystal, a cholesteric liquid crystal, a smectic liquid crystal, or a combination thereof.

9. The transparent device according to claim 1, wherein the transparent conductive oxide consists of one or more of ZnO and CuO.

10. A transparent device for use in optical applications, the device comprising:
    a first layer comprising a first transparent conductive oxide;
    a second layer comprising a first transparent semiconductor, the second layer having a surface in contact with the first layer;
    a third layer comprising a liquid crystal, the third layer having a surface facing the second layer; and
    a fourth layer comprising either a second transparent conductive oxide or a second transparent semiconductor, the fourth layer having a surface facing the third layer,
    wherein the second layer is a pn-heterojunction or a pn-homojunction;
    further comprising a first alignment layer between the second layer and the third layer, and a second alignment layer between the third layer and the fourth layer, the first alignment layer and second alignment layer comprising a material selected from the group consisting of polyimide, polyamide, and azo compounds, wherein the fourth layer comprises two or more sublayers, the two or more sublayers comprising one or more metal non-oxides or nonmetals selected from the group consisting of ZnS, CS, GaN, graphitic carbon nitride (g-CN), and SiC, each of the two or more sublayers having the same or distinct material composition.

11. A transparent device for use in optical applications, the device comprising:

a first layer comprising a first transparent conductive oxide;
a second layer comprising a first transparent semiconductor, the second layer having a surface in contact with the first layer;
a third layer comprising a liquid crystal, the third layer having a surface facing the second layer; and
a fourth layer comprising either a second transparent conductive oxide or a second transparent semiconductor, the fourth layer having a surface facing the third layer,
wherein the second layer is a pn-heterojunction or a pn-homojunction;
further comprising a first alignment layer between the second layer and the third layer, and a second alignment layer between the third layer and the fourth layer, the first alignment layer and second alignment layer comprising a material selected from the group consisting of polyimide, polyamide, and azo compounds, wherein the second layer comprises two or more layers comprising metal oxides, wherein each layer comprises one or more metal oxides selected from the group consisting of oxides of Co, Cu, Fe, Mn, Ni, Sn, and Zn, each of the two or more layers having the same or distinct material composition, and
wherein the fourth layer comprises two or more sublayers, the two or more sublayers comprising one or more metal non-oxides or nonmetals selected from the group consisting of ZnS, CS, GaN, graphitic carbon nitride (g-CN), and SiC, each of the two or more sublayers having the same or distinct material composition.

* * * * *